United States Patent
Künzel et al.

(10) Patent No.: US 7,024,332 B2
(45) Date of Patent: Apr. 4, 2006

(54) METHOD AND DEVICE FOR IDENTIFYING A FAULTY ROTOR POSITION ANGLE SIGNAL

(75) Inventors: Stefan Künzel, Erlangen (DE); Mihaly Nemeth-Csoka, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/999,189

(22) Filed: Nov. 29, 2004

(65) Prior Publication Data

US 2005/0140324 A1 Jun. 30, 2005

(30) Foreign Application Priority Data

Nov. 27, 2003 (DE) ................. 103 55 423

(51) Int. Cl.
G01C 17/00 (2006.01)
G01C 19/00 (2006.01)

(52) U.S. Cl. ............................ 702/151; 318/700

(58) Field of Classification Search .............. 702/151
See application file for complete search history.

(56) References Cited

U.S. PATENT DOCUMENTS 6,163,127 A * 12/2000 Patel et al. ................ 318/700
6,232,737 B1 5/2001 Kachi et al.
6,396,236 B1 5/2002 Luukko
2003/0025475 A1 * 2/2003 Won et al. ................ 318/701

FOREIGN PATENT DOCUMENTS

JP 09056199 2/1997

OTHER PUBLICATIONS

J. Hu et al.: "New Integration Algorithms for Estimating Motor Flux over a Wide Speed Range" in IEEE Transations power power electronics, vol. 13, No. 5, Sep. 1998, pp. 969-977.
R. Lorenz et al.: Encorderless IPM Traction Drive for EV/HEV's in Industry Applications Conference, 2001, Thirty-Sixth IAS Annual Meeting, Conference Record of the 2001 IEEE, vol. 3, Sep. 30, 2001-Oct. 4, 2001, pp. 1703-1707.

* cited by examiner

Primary Examiner—Bryan Bui
Assistant Examiner—Demetrius Pretlow
(74) Attorney, Agent, or Firm—Henry M. Feiereisen

(57) ABSTRACT

A method and a system for identifying a faulty rotor position angle signal of a synchronous motor powered by a converter, wherein a first flux angle is determined from the rotor position angle signal, wherein from the motor currents of the synchronous motor a current pointer is determined, wherein from a voltage pointer of the motor voltages of the synchronous motor and the current pointer a second flux angle is determined using a flux modeler of the synchronous motor, and wherein in the event of insufficient agreement between the first and second flux angle a faulty rotor position angle signal is identified.

13 Claims, 3 Drawing Sheets

METHOD AND DEVICE FOR IDENTIFYING A FAULTY ROTOR POSITION ANGLE SIGNAL

CROSS-REFERENCES TO RELATED APPLICATIONS

This application claims the priority of German Patent Application, Serial No. 103 55 423.8, filed Nov. 27, 2003, pursuant to 35 U.S.C. 119(a)–(d).

BACKGROUND OF THE INVENTION

The present invention relates to a system and method for identifying a faulty rotor position angle signal of a synchronous motor powered by a converter. The invention also relates to a computer with a computer program stored on a data carrier for carrying out the method and to a machine tool or production machine using the system and method.

Nothing in the following discussion of the state of the art is to be construed as an admission of prior art.

Motors of electric drives are frequently powered and controlled by a converter. The motor control can include a field-based controller which decouples the field-producing and torque-producing current components. The current components can be decoupled, for example, by computing the current components in a coordinate system that rotates with the rotor flux of the motor. Such field-based controller requires information about the rotor position angle of the rotor for computing the flux angle in the motor. The rotor position angle can be measured by a transducer disposed on the motor and transmitted in form of a rotor position angle signal. However, when a transducer malfunctions with a field-based controller, the controller loses the information above the angle position of the rotating field in the motor. A reliable control of the motor with a field-based controller is then no longer possible.

The rotor position angle is frequently measured by the transducer incrementally without relying on an absolute reference position. The absolute position of the rotor in a stationary state is determined directly only at the time the motor is switched on. If an error occurs, the motor may continue to accelerate under certain unfavorable conditions (angle error between 90° and 270°) which can endanger the equipment or personnel. The same problem can occur if the incremental position indicator loses position markers.

To prevent endangering equipment or personnel, the drive must therefore be stopped as soon as possible, in particular when using linear motors with a limited range of travel, if a faulty rotor position angle signal is detected, or other measures must be taken.

It would therefore be desirable and advantageous to provide a system and method for identifying a faulty rotor position angle signal of a synchronous motor, to obviate prior art shortcomings and to allow safe operation of a synchronous motor powered by a converter if a faulty rotor position angle signal is detected.

SUMMARY OF THE INVENTION

According to one aspect of the invention, a method for identifying a faulty rotor position angle signal of a synchronous motor powered by a converter includes the steps of measuring on the synchronous motor a rotor position angle signal, determining from the measured rotor position angle signal a first flux angle, measuring on the synchronous motor at least one motor current, determining from the measured motor current or motor currents a current pointer, measuring on the synchronous motor at least one motor voltage, and determining from the measured motor voltage or motor voltages a voltage pointer. The method employs a flux modeler of the synchronous motor to determine from the voltage pointer and the current pointer a second flux angle, and identifies a faulty rotor position angle signal based on an agreement, or lack thereof, between the first and second flux angles.

With the method of the invention, a faulty rotor rotation angle signal can be already recognized at a very low rotation speed of the synchronous motor, which is only a fraction of the nominal rotation speed of the synchronous motor.

According to another feature of the invention, the flux modeler can compute an induction voltage pointer by using the relationship $$\vec{U}_{ind} = \vec{U} - R_A \cdot \vec{I} - \frac{d\vec{I}}{dt} \cdot L_A.$$

The flux modeler can then compute from the induction voltage pointer an angle of the induction voltage pointer, and determine the second flux angle by subtracting from the angle of the induction voltage pointer an angle of 90° for a positive angular rotor frequency ω of the synchronous motor, or by subtracting from the angle of the induction voltage pointer a subtraction angle of 270° for a negative angular rotor frequency ω of the synchronous motor. $\vec{U}$ is herein the voltage pointer, $\vec{I}$ the current pointer, $R_A$ the stator winding resistance, $L_A$ the stator winding inductance, and $\vec{U}_{ind}$ the induction voltage pointer. The flux modeler can hence determine the angle $\phi_{ind}$ of the induction voltage pointer $\vec{U}_{ind}$ in a particularly simple manner.

According to another feature of the invention, the current pointer and voltage pointer can be referenced to a stationary coordinate system that is fixed relative to a stator of the synchronous motor. Alternatively, the current pointer and voltage pointer can be referenced to a coordinate system that rotates with a rotor flux of the synchronous motor, since the corresponding current and voltage pointers are already computed by the field-based controller, so that no additional computing resources are required for computing the pointer.

According to another feature of the invention, the voltage pointer of the motor voltage or voltages of the synchronous motor can be determined from measured terminal voltages of the synchronous motor. With this approach, the voltage pointer of the motor voltages of the synchronous motor can be reliably determined independent of the controller.

According to another feature of the invention, the voltage pointer can be derived from voltages that are defined by a controller of the synchronous motor and supplied to the synchronous motor by the converter. This obviates the need to measure in addition terminal voltages of the synchronous motor.

According to another feature of the invention, the derived voltage pointer can be used as an input value of the voltage pointer for the flux modeler. With a field-based controller, the applied voltage pointer is typically provided to the converter as a desired value and is therefore already computed by the field-based controller, so that this voltage pointer can be used as a voltage pointer input value of the flux modeler.

Suitably, the synchronous motor can be switched off if a faulty rotor position angle signal is identified, because the risk for equipment and/or personnel can then be safely eliminated. The motor can be switched off, for example, by blocking the pulses to the converter. As an additional measure, for example, a short-circuit braking action of the rotor can be initiated.

According to another feature of the present invention, the synchronous motor can be switched to a controlled safe state if a faulty rotor position angle signal is identified. With this approach, the production or manufacturing process can be continued even when a faulty rotor position angle signal is detected.

A method according to the present invention is particularly suited for identifying a faulty rotor position angle signal of a synchronous motor powered by a converter in machine tools or production machines, because in these applications damages resulting from faulty rotor position angle signals can be quite substantial. However, it should be mentioned at this point that the method of the invention can also employed in other technical areas. The motor control also need not be a field-based controller, and the method and system of the invention can be applied to other types of controllers.

Advantageously, a data carrier with a computer program stored on the data carrier can be used for carrying out the method of the invention. A computer with a program memory can execute the computer program to carry out the method of the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
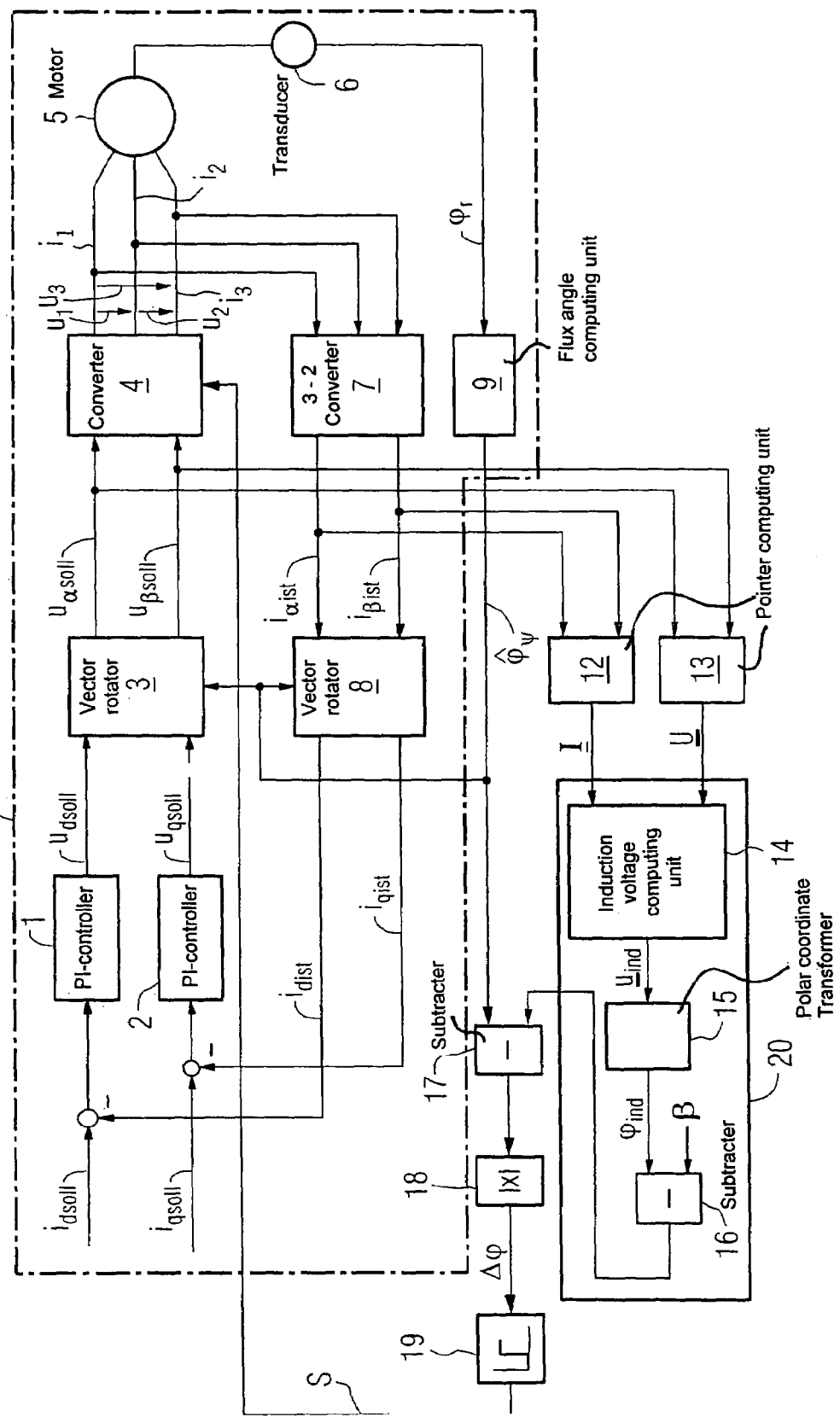
FIG. 1 shows schematically a block diagram of a field-based controller employing a flux modeler.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in form of a schematic block diagram a field-based controller 21 that controls a synchronous motor 5 using a flux modeler 20. The synchronous motor 5 can be implemented as a rotary motor or a linear motor. Three-phase power is supplied to the synchronous motor 5 by a converter 4 by way of three current phases $i_1$, $i_2$, and $i_3$. The corresponding voltages between the phases are indicated by $u_1$, $u_2$, and $u_3$. The three motor currents $i_1$, $i_2$, and $i_3$ are measured and supplied to a 3-2 converter 7. The 3-2 converter 7 computes from the three motor currents $i_1$, $i_2$, and $i_3$ the orthogonal current components $i_{\alpha ist}$ and $i_{\beta ist}$ as so-called current pointer values within a stationary coordinate system affixed to the stator by using the equation (1):

$$a. \begin{pmatrix} i_{\alpha ist} \\ i_{\beta ist} \end{pmatrix} = \begin{pmatrix} \frac{2}{3} & -\frac{1}{3} & -\frac{1}{3} \\ 0 & \frac{1}{\sqrt{3}} & -\frac{1}{\sqrt{3}} \end{pmatrix} \cdot \begin{pmatrix} i_1 \\ i_2 \\ i_3 \end{pmatrix} \quad (1)$$

A vector rotation unit 8 transforms the actual current component $i_{\alpha ist}$ as well as the actual current component $i_{\beta ist}$ via the complex relationship (2)

$$(i_{dist}+ji_{qist})=(i_{\alpha ist}+ji_{\beta ist})\cdot e^{-j\hat{\phi}_\Psi} \quad (2)$$

wherein
e: Euler number
j: imaginary unit ($j^2=-1$)

into the torque-producing actual current component $i_{qist}$ and the field-producing actual current component $i_{dist}$ in an orthogonal coordinate system that rotates with the rotor flux of the motor 5. A flux angle computing unit 9 computes the required flux angle $\hat{\phi}_\Psi$ from a motor position angle signal $\phi_r$ received from a transducer 6 connected to the motor 5.

In the depicted embodiment, the transducer 6 provides to the flux angle computing unit 9 a rotor position angle $\phi_r$ of the rotor of the synchronous motor 5 as the rotor position angle signal $\phi_r$. The flux angle computing unit 9 computes from the rotor position angle $\phi_r$ of the synchronous motor 5 the flux angle $\hat{\phi}_\Psi$ of the rotor flux of the synchronous motor 5, using existing information about the mechanical and electrical configuration of the synchronous motor 5.

The actual current components $i_{dist}$ and $i_{qist}$ in the rotating coordinate system are controlled by supplying the difference between the desired current component $i_{dsoll}$ and the actual current components $i_{dist}$ to a proportional-integral (PI) controller 2. The desired current components $i_{dsoll}$ and $i_{qsoll}$ in the rotating coordinate system can be supplied either directly or by a master controller, for example a master position controller (not shown for sake of clarity). The PI-controller 1 outputs the field-producing desired voltage component $i_{dsoll}$ to a vector rotation unit 3 as a first input value. The PI-controller 2 outputs the desired torque-producing voltage component $U_{qsoll}$ to the vector rotation unit 3 as a second input value. The vector rotation unit 3 computes from the afore-described desired voltage component $u_{dsoll}$ and $u_{qsoll}$ obtained in the rotating coordinate system as well as from the flux angle $\hat{\phi}_\Psi$, using the relationship (3)

$$(u_{\alpha soll}+ju_{\beta soll})=(u_{dsoll}+ju_{qsoll})\cdot e^{j\hat{\phi}_\Psi} \quad (3)$$

the desired voltage components $u_{\alpha soll}$ and $u_{\beta soll}$ in the stationary coordinate system as so-called voltage pointers. The desired voltage components $u_{\alpha soll}$ and $u_{\beta soll}$ are supplied to a control set disposed inside the converter 3 (not shown in FIG. 1). The control set computes from the desired voltage components $u_{\alpha soll}$ and $u_{\beta soll}$ the required trigger angles for the converter 4 and the trigger pulses that control the valves of the converter.

If the transducer 6 fails in a field-based controller illustrated in the embodiment of FIG. 1, or if the rotor position angle signal $\phi_r$ is faulty in general, then the correct flux angle $\hat{\phi}_\Psi$ can no longer be computed. The field-based controller is then unable to obtain the orientation of the rotation field of the synchronous motor 5. The field-based controller is then no longer able to control, in particular brake, the synchronous motor 5. This applies not only to the field-based controller depicted in the embodiment of FIG. 1, but can in principle apply to any field-based controller, if a rotor position angle signal $\phi_r$ is faulty.

However, with the method of the invention, a flux modeler 20 can be used to compute from the motor voltages and motor currents a second flux angle $\phi_\Psi$, which is then compared with the first measured flux angle $\hat\phi_\Psi$. If there is insufficient agreement between the first flux angle and the second flux angle, then the rotation position angle signal $\phi_r$ is identified as being faulty.

Figure 2:
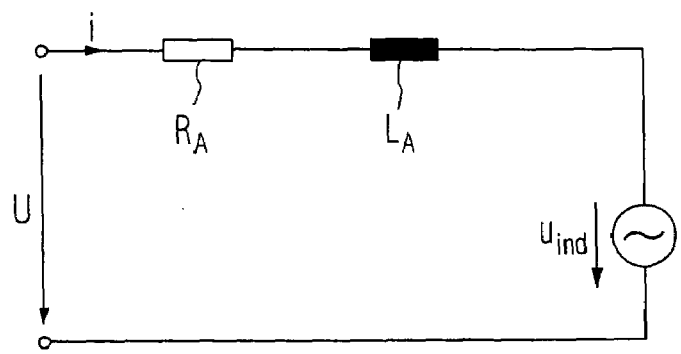
FIG. 2 shows schematically an equivalent circuit diagram of a synchronous motor.

For a better understanding of the flux modeler 20 shown schematically in FIG. 1, an equivalent electric circuit diagram of a single-phase synchronous motor is shown schematically in FIG. 2. When a voltage u is applied to the terminals of the synchronous motor, a current i begins to flow through the stator winding resistor $R_A$ and the stator winding inductance $L_A$. An induction voltage $u_{ind}$ with the opposite polarity of the terminal voltage u of the synchronous motor is induced, when the current i causes a rotation of the rotor of the synchronous motor, or for a linear motor, a linear motion of the rotor.

Figure 3:
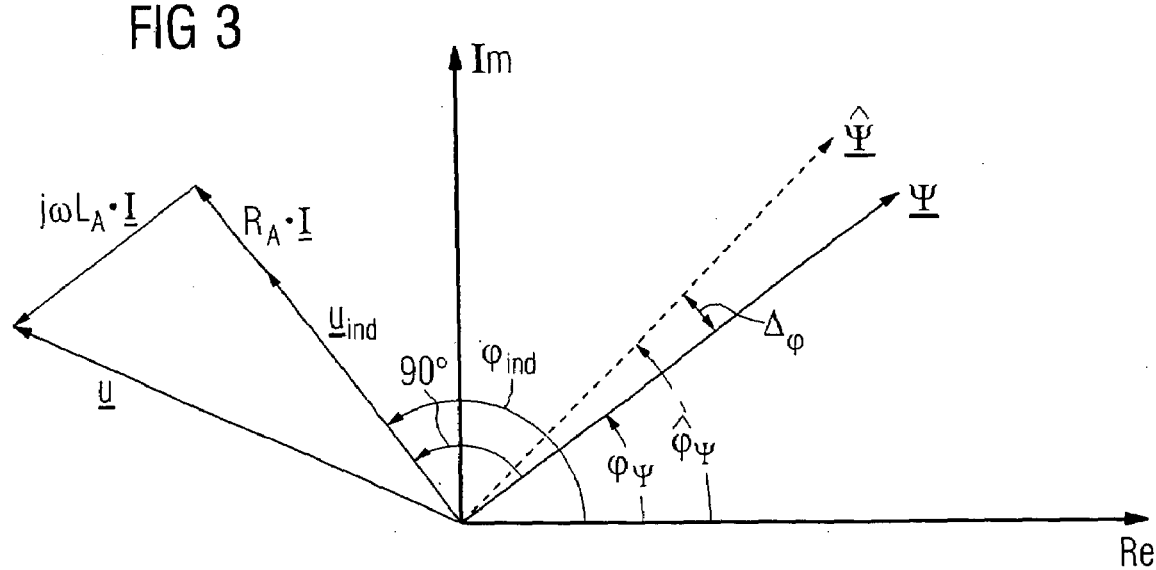
FIG. 3 shows a vector diagram with current pointers.

FIG. 3 shows the pointers derived from the equivalent electric circuit diagram of FIG. 2 in a stationary coordinate system affixed to the stator with a real part axis Re and an imaginary part axis Im. The depicted pointers rotate with the angular frequency $\omega$ of the rotor. The voltage pointer $\vec{U}$ of the terminal voltage is obtained by vector or complex addition from the induction voltage pointer $\vec{U}_{ind}$ of the induction voltages, from the voltages across the stator winding resistors in form of a voltage resistance pointer $R_A \cdot \vec{I}$, wherein $\vec{I}$ represents the current pointer of the motor currents $i_1$, $i_2$, and $i_3$, and wherein the voltages across the stator winding inductances are present as a stator winding voltage pointer $j\omega L_A \vec{I}$.

Accordingly, the stationary induction voltage pointer $\vec{U}_{ind}$ is obtained as $$\vec{U}_{ind} = \vec{U} - R_A \cdot \vec{I} - j\omega L_A \vec{I} \quad (4)$$

and for the general case $$\vec{U}_{ind} = |\vec{U}_{ind}| \cdot e^{j\varphi_{ind}} = \vec{U} - R_A \cdot \vec{I} - \frac{d\vec{I}}{dt} \cdot L_A = j\omega|\vec{\Psi}| \cdot e^{j\varphi_\Psi}, \quad (5)$$

wherein $\vec{U}$: voltage pointer
$\vec{I}$: current pointer
$R_A$: stator winding resistance
$L_A$: stator winding inductance
$\vec{U}_{ind}$: induction voltage pointer
$\phi_{ind}$: angle of the induction voltage pointer
t: time
$\omega$: angular frequency of the rotor
$\vec{\Psi}$: flux pointer Based on the electrical situation in the motor, the flux angle $\phi_\Psi$ of the flux pointer $\vec{\Psi}$ of the rotor flux is ideally advanced according to equation (5) for a positive angular frequency $\omega$ by 90° relative to the angle $\phi_{ind}$ of the induction voltage pointer $\vec{U}_{ind}$, i.e.

$$\phi_\Psi = \phi_{ind} - 90° \text{ (for } \omega > 0) \quad (7)$$

For a negative angular frequency $\omega$, the flux angle $\phi_\Psi$ of the flux pointer $\vec{\Psi}$ of the rotor flux is advanced according to equation (5) by 270° relative to the angle $\phi_{ind}$ of the induction voltage pointer $\vec{U}_{ind}$, i.e.

$$\phi_\Psi = \phi_{ind} - 270° \text{ (for } \omega < 0) \quad (8)$$

FIG. 3 shows for a positive angular frequency $\omega$ the resulting flux pointer $\vec{\Psi}$ with the angle $\phi_\Psi$ computed by the flux modeler. The magnitude of the flux pointer $\vec{\Psi}$ is not computed by the flux modeler, since information about the magnitude of the flux pointer $\vec{\Psi}$ is not required for carrying out the method of the invention. The flux angle $\hat\phi_\Psi$ determined by the flux computation unit 9 from the rotor position angle signal $\phi_r$ together with the associated rotor flux $\vec{\Psi}$ are indicated in FIG. 3 by a dotted line. A difference angle $\Delta\phi$ is obtained from the difference between the flux angle $\phi_\Psi$ determined with the flux modeler 20, which in the context of the present invention is also referred to as second flux angle $\phi_\Psi$, and the flux angle $\hat\phi_\Psi$ determined by measuring the rotor position angle signal $\phi_r$, which in the context of the present invention is also referred to as first flux angle $\hat\phi_\Psi$. If there is insufficient agreement between the first flux angle $\hat\phi_\Psi$ and the second flux angle $\phi_\Psi$, i.e., is the magnitude of the difference angle $\Delta\phi$ is too large, then it will be assumed that a faulty rotor position angle signal $\phi_r$ was supplied to the flux angle computation unit 9 as input value, and the rotor position angle signal $\phi_r$ is identified as being faulty. Considerations similar to those of FIG. 3 apply to a negative angular frequency $\omega$.

FIG. 1 shows an embodiment of the method of the invention, with the flux modeler 20 representing the core of the method. In the depicted embodiment, the voltage pointer $\vec{U}$ is already represented by the corresponding real and imaginary parts of the desired voltage components $u_{\alpha soll}$ and $u_{\beta soll}$. The voltage pointer $\vec{U}$ is computed by a pointer computing unit 13 according to the relationship (8)

$$\vec{U} = u_{\alpha soll} + j u_{\beta soll} \quad (8)$$

Likewise, the current pointer $\vec{I}$ is computed from the actual current components $i_{\alpha ist}$ and $i_{\beta ist}$ according to the relationship $$\vec{I} = i_{\alpha ist} + j i_{\beta ist} \quad (9)$$

The voltage pointer $\vec{U}$ and the current pointer $\vec{I}$ are supplied to a unit 14 for calculating the induction voltage $\vec{U}_{ind}$. The unit 14 computes the induction voltage pointer $\vec{U}_{ind}$ from the voltage pointer $\vec{U}$, the current pointer $\vec{I}$, the stator winding resistance $R_A$ and the stator winding inductance $L_A$. The stator winding resistance $R_A$ and the stator winding inductance $L_A$ are known from the manufacturer's data sheet for the synchronous motor. The computed induction voltage pointer $\vec{U}_{ind}$ is supplied as input value to a polar coordinate converter 15, which computes the magnitude of $\vec{U}_{ind}$ and the angle $\phi_{ind}$ of the induction voltage pointer $\vec{U}_{ind}$ according to the first part of equation (5) and outputs the angle $\phi_{ind}$. In a following subtracter 16, for a positive angular frequency ω, a subtraction angle β of preferably 90° is subtracted from the angle $\phi_{ind}$ of the induction voltage pointer $\vec{U}_{ind}$, or for a negative angular frequency ω, a subtraction angle β of preferably 270° is subtracted from the angle $\phi_{ind}$ of the induction voltage pointer $\vec{U}_{ind}$, thereby calculating a second flux angle $\phi_\Psi$. A subtracter 17 subsequently subtracts the second flux angle $\phi_\Psi$ from the first flux angle $\hat{\phi}_\Psi$, and the computed in difference is supplied to an absolute value unit 18, which outputs the difference angle Δφ as output value. The difference angle Δφ is then supplied as input value to a limiter 19. If the difference angle Δφ exceeds a critical difference angle $\Delta\phi_{crit}$ supplied by the user, then a signal S at the output of the limiter 19 is set to a logical high level, indicating an identified faulty rotor position signal $\phi_r$.

In the described embodiment, the signal S is supplied as input value to the converter 4, which blocks the pulses when a logical high level of the signal S is detected, thereby safely and rapidly switching off the synchronous motor.

Alternatively, the signal S can also be used to control the motor when a logical high level of the signal S is detected, by using a so-called transmitter-less control, i.e. a control that does not require a rotor position angle measured directly by a transducer to control the motor. In this case, the manufacturing or production process can advantageously continue, and only an alarm message is provided to the user.

It is easy to determine if the angular frequency ω is positive or negative by evaluating the rotor position angle signal $\phi_r$. An increasing or decreasing value of the rotor position angle can be associated with a positive or negative angular frequency, respectively, depending on a defined reference direction. It will be understood that the rotation direction of the angular frequency can also be derived from the pointer values.

It is also possible to use for the flux modeler 20 current and voltage pointers that are referenced to a coordinate system that rotates with the rotor flux of the synchronous motor, instead of current and voltage pointers that are referenced to a stationary coordinate system affixed to the stator. In this case, the desired voltage component $u_{dsoll}$ and the desired voltage component $u_{qsoll}$, or the actual voltage components $u_{dist}$ and $u_{qist}$, would be supplied in FIG. 1 to the pointer computing unit 12, instead of the actual current components $i_{\alpha ist}$ and $i_{\beta ist}$, or the desired voltage components $u_{\alpha soll}$ and $u_{\beta soll}$.

In the afore-described embodiment, the voltage pointer $\vec{U}$ is advantageously derived from voltages that are provided to a controller of the synchronous motor and are then supplied to the synchronous motor by a converter controlled by the controller. The supplied voltages are her present in the form of the desired voltage components $u_{\alpha soll}$ and $u_{\beta soll}$ and represent the real and imaginary part of the voltage pointer $\vec{U}$ supplied by the converter. Alternatively, the terminal voltage of the synchronous motor can also be measured by suitable transducers, and the real and imaginary part of the voltage pointer $\vec{U}$ can be determined by another 3-2 converter (not shown) that is independent of the controller. The flux modeler then operates more independently from the controller 21 so that the second flux angle $\phi_\Psi$ can be determined more accurately.

Figure 4:
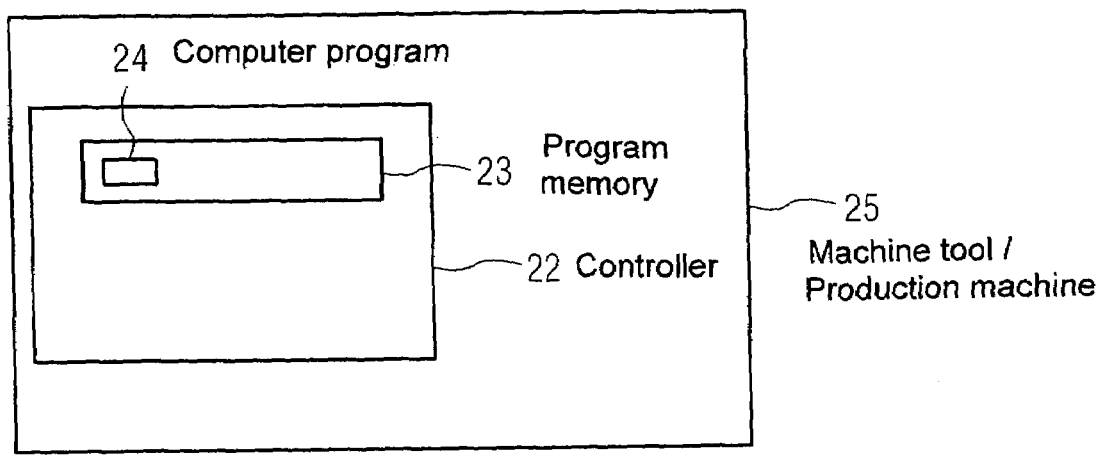
FIG. 4 is a schematic block diagram of a machine tool or production machine.
Figure 4:
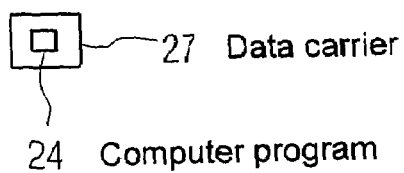

As seen in FIG. 4, a computer 22 with a program memory 23 can be provided for executing the method of the invention. The program memory 23 can store a computer program 24 that can be called by the computer 22 to execute the method. The computer 22 can be implemented as a controller 22 which can be an element of a machine tool or production machine 25. The machine tool or production machine 25 can include additional elements, which are not essential for an understanding of the invention and are not shown in FIG. 4 for sake of clarity.

The computer program 24 can also be stored on a data carrier 27 implemented, for example, as a flash card, diskette, CD-ROM, DVD, a hard drive and the like.

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for identifying a faulty rotor position angle signal of a synchronous motor powered by a converter, comprising the steps of:
   measuring a rotor position angle signal of the synchronous motor;
   determining from the measured rotor position angle signal a first flux angle;
   measuring at least one motor current of the synchronous motor;
   determining from the measured motor current or motor currents a current pointer;
   measuring at least one motor voltage of the synchronous motor;
   determining from the measured motor voltage or motor voltages a voltage pointer;
   determining, with a flux modeler that models a flux of the synchronous motor, a second flux angle from the voltage pointer and the current pointer; and
   identifying a faulty rotor position angle signal based on an agreement, or lack thereof, between the first and second flux angles.

2. The method of claim 1, wherein the flux modeler computes an induction voltage pointer by using a relationship $$\vec{U}_{ind} = \vec{U} - R_A \cdot \vec{I} - \frac{d\vec{I}}{dt} \cdot L_A;$$

computes from the induction voltage pointer an angle of the induction voltage pointer; and determines the second flux angle by subtracting from the angle of the induction voltage pointer a subtraction angle of 90° for a positive angular rotor frequency of the synchronous motor, or by subtracting from the angle of the induction voltage pointer a subtraction angle of 270° for a negative angular rotor frequency of the synchronous motor, wherein $\vec{U}$ is the voltage pointer, $\vec{I}$ is the current pointer, $R_A$ is the stator winding resistance, $L_A$ is the stator winding inductance, and $\vec{U}_{ind}$ is the induction voltage pointer.

3. The method of claim 1, wherein the current pointer and voltage pointer are referenced to a stationary coordinate system that is fixed relative to a stator of the synchronous motor.

4. The method of claim 1, wherein the current pointer and voltage pointer are referenced to a coordinate system that rotates with a rotor flux of the synchronous motor.

5. The method of claim 1, wherein the voltage pointer of the motor voltage or voltages of the synchronous motor is determined from measured terminal voltages of the synchronous motor.

6. The method of claim 1, wherein the voltage pointer is derived from voltages that are defined by a controller of the synchronous motor and supplied to the synchronous motor by the converter.

7. The method of claim 6, wherein the derived voltage pointer is used as an input value of the voltage pointer for the flux modeler.

8. The method of claim 1, further comprising switching off the synchronous motor if a faulty rotor position angle signal is identified.

9. The method of claim 1, further comprising switching the synchronous motor to a controlled safe state if a faulty rotor position angle signal is identified.

10. A data carrier with a computer program stored on the data carrier, said computer program causing a computer to identify a faulty rotor position angle signal of a synchronous motor powered by a converter, by executing in the computer comprising the steps of:
measuring a rotor position angle signal of the synchronous motor;
determining from the measured rotor position angle signal a first flux angle;
measuring at least one motor current of the synchronous motor;
determining from the measured motor current or motor currents a current pointer;
measuring at least one motor voltage of the synchronous motor;
determining from the measured motor voltage or motor voltages a voltage pointer;
determining, with a flux modeler that models a flux of the synchronous motor, a second flux angle from the voltage pointer and the current pointer; and
identifying a faulty rotor position angle signal based on an agreement, or lack thereof, between the first and second flux angles.

11. A computer with a program memory having stored therein a computer program, said computer program being called by the computer and causing the computer to identify a faulty rotor position angle signal of a synchronous motor powered by a converter by executing in the computer comprising the steps of:
measuring a rotor position angle signal of the synchronous motor;
determining from the measured rotor position angle signal a first flux angle;
measuring at least one motor current of the synchronous motor;
determining from the measured motor current or motor currents a current pointer;
measuring at least one motor voltage of the synchronous motor;
determining from the measured motor voltage or motor voltages a voltage pointer;
determining, with a flux modeler that models a flux of the synchronous motor, a second flux angle from the voltage pointer and the current pointer; and
identifying a faulty rotor position angle signal based on an agreement, or lack thereof, between the first and second flux angles.

12. The computer of claim 11, wherein the computer is implemented as a controller.

13. A machine tool or production machine with a controller that identifies a faulty rotor position angle signal of a synchronous motor powered by a converter comprising the steps:
measuring a rotor position angle signal of the synchronous motor;
determining from the measured rotor position angle signal a first flux angle;
measuring at least one motor current of the synchronous motor;
determining from the measured motor current or motor currents a current pointer;
measuring at least one motor voltage of the synchronous motor;
determining from the measured motor voltage or motor voltages a voltage pointer;
determining, with a flux modeler that models a flux of the synchronous motor, a second flux angle from the voltage pointer and the current pointer; and
identifying a faulty rotor position angle signal based on an agreement, or lack thereof, between the first and second flux angles.

* * * * *